United States Patent Office 3,340,795
Patented Sept. 12, 1967

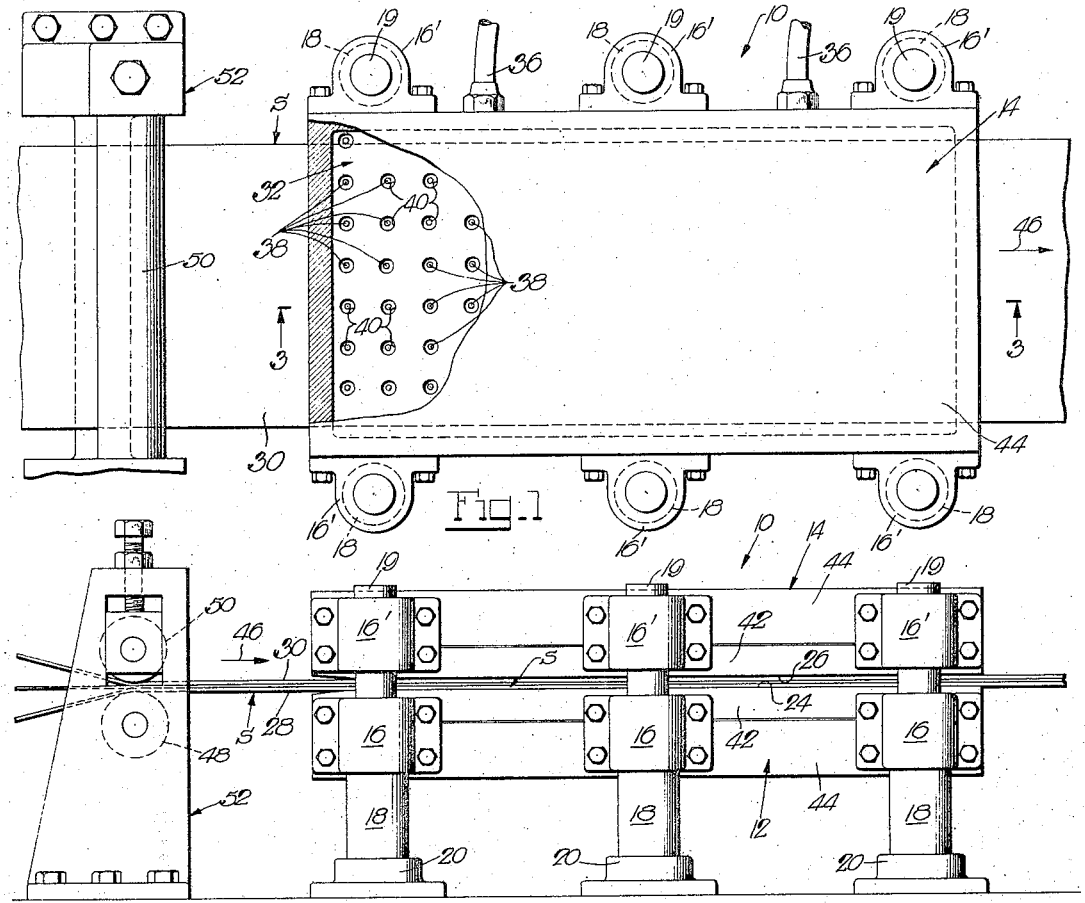
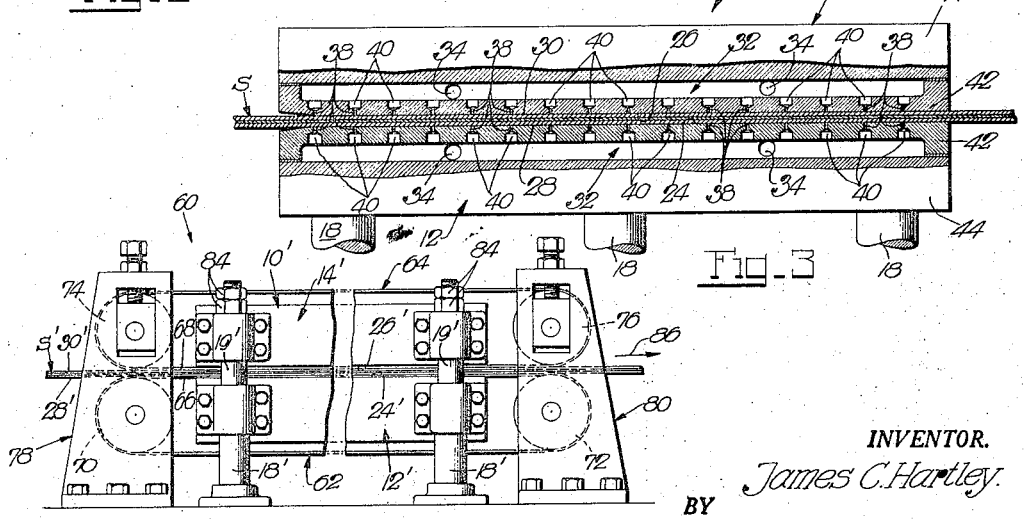

3,340,795
CONTINUOUS LAMINATING PRESS WITH AIR FILM LUBRICATION
James C. Hartley, Bridgeport, Conn., assignor of fifty percent to Gustaf R. Young, Branford, Conn.
Filed Feb. 3, 1964, Ser. No. 341,934
4 Claims. (Cl. 100—154)

ABSTRACT OF THE DISCLOSURE

The disclosure deals with a laminating press having companion platens with opposite faces and narrow orifices leading to said faces for constantly supplying air under pressure to air films of high integrals of pressure between these faces and moving stock therebetween, with these air films applying laminating pressure to the moving stock. In another form of the disclosure the air films are applied between the platen faces and adjacent operating belt runs which transmit the laminating pressure to the stock therebetween and travel with the latter.

---

This invention relates to laminating presses in general, and to presses for laminating continuously fed laminar sheet stock in particular.

It is an object of the present invention to provide a laminating press which will perform its lamination function on laminar sheet stock as the same is continuously fed, yet with the lamination being as strong and uniform as though achieved by subjecting the stock to lamination pressure between confronting surfaces of companion platens of a stationary press.

It is another object of the present invention to provide a laminating press of this type which performs on continuously fed laminar stock, and which for performance of its lamination function has indeed stationary companion pressure platens between which the fed stock passes while being at the same time subjected to entirely adequate lamination pressure therefrom without encountering more than negligible resistance, if any, to its feed from the pressure-exerting platens, by introducing and constantly maintaining between the interfaces of the stock and platens air films on which the stock floats between the platens and which have sufficiently high integrals of pressure over the interfaces to transmit the full lamination pressure from the platens to the stock. Such a press may not only perform on stock which is fed or at rest, with the lamination being of optimum strength and uniformity, but it will not be subject to wear practically indefinitely regardless of the lamination pressures applied.

It is a further object of the present invention to provide a laminating press of this type the stationary companion pressure platens of which have, for the introduction and maintenance of the aforementioned air films between the interfaces of the stock and platens, internal chambers which are constantly supplied with compressed air, and a multiplicity of orifices between these chambers and the respective pressure-exerting faces of the platens. To this end, the orifices are kept quite small and spaced sufficiently closely in order to maintain, at reasonably low pressure loss of the air in the orifices, air films of minimum thickness which have low pressure gradients and, hence, high values of the integral of pressure over the interfaces.

Another object of the present invention is to provide a laminating press of this type that lends itself to lamination of laminar sheet stock which for various reasons, such as being air-permeable or rough-faced, for instance, cannot confine the aforementioned air films, by interposing between the adjacent stock and platen faces parallel runs of belts of steel or the like which are led over rotary pulleys and have sufficiently smooth faces to cooperate with the platen faces in confining the air films at the imperative uniformity and continuity throughout.

Other objects and advantages will appear to those skilled in the art from the following, considered in conjunction with the accompanying drawings.

In the accompanying drawings, in which certain modes of carrying out the present invention are shown for illustrative purposes:

FIG. 1 is a plan view, partly in section, of a laminating press embodying the present invention;

FIG. 2 is a side view of the same press;

FIG. 3 is a partial elevational view of, and a partial section through, the press, with the section taken on the line 3—3 of FIG. 1; and FIG. 4 is a side view of a press installation embodying the present invention in a modified manner.

Referring to the drawings, and more particularly to FIGS. 1 to 3 thereof, the reference numeral 10 designates a laminating press comprising companion platens 12 and 14 which in this instance are disposed substantially horizontally, with the lower platen 12 being, through intermediation of side brackets 16, mounted on upright posts 18 on bases 20, and the upper platen 14 being, through intermediation of similar side brackets 16', guided on reduced shanks 19 of the posts 18 for movement to and from the lower platen 12. The platens 12 and 14 have plane parallel faces 24 and 26 which are preferably quite smooth for reasons described hereinafter, with these faces 24 and 26 being adapted to exert against laminar sheet stock s therebetween the necessary pressure for their lamination. The lamination pressure is in the present example determined by the weight of, and if need be additional weight on, the upper platen 14.

The present press 10 is adapted for laminating stock s while in motion or at rest, and especially for laminating continuous or successive stock while being continuously fed. To this end, and in accordance with the present invention, provisions are made for introducing and maintaining between the interfaces 24, 28 and 26, 30 of the platens 12, 14 and the stock s air films (not shown) on which the stock floats and is for that reason alone movable, and which have sufficiently large integrals of pressure to impart the lamination pressure from the platens 12, 14 to the stock s. Thus, each of the platens 12 and 14 has an internal chamber 32 with air inlets 34 which have suitable hose connections 36 with a source of compressed air. There is preferably interposed between the hose connections 36 and compressed air source a suitable control valve (not shown) with which to regulate the pressure of the air admitted into the chambers 32. There are further provided in, and distributed over, the opposing faces 24 and 26 of the platens 12 and 14 a multiplicity of orifices 38 which lead to the respective chambers 32 (FIGS. 1 and 3). Since the orifices 38 must be quite small at least at the platen faces 24 and 26 for reasons described hereinafter, they are in the present instance started advantageously as larger inner bores 40 extending close to the respective platen faces, and are finished by greatly facilitated short drilling outwardly the rest of the way with the requisite fine, but more easily breakable, drills. To this end, each platen 12 and 14 is made in two sections 42 and 44 (FIG. 3) which are closed and sealed in any suitable manner (not shown) after the sections 42 have been drilled.

The exemplary stock s, which is to be laminated while in continuous forward motion in the direction of the arrow 46, is continuous and the individual sheets thereof with suitably applied adhesive resin or the like are brought into laminar relation with each other just prior to their pass into the press 10 between rotary companion rolls 48 and 50 in a stand 52, of which the top roll 50 is vertically adjustable to accommodate laminar stock of different thickness. The stock s may be fed in forward direction by suitable power-operated companion rolls (not shown) to the right of FIGS. 1 and 2.

In operation of the press 10 and with the laminar stock being constantly fed at appropriate speed, compressed air is constantly admitted into the platen chambers 32 from where it passes through the orifices 38 to maintain between the interfaces 24, 28 and 26, 30 of the platens 12, 14 and the passing stock s air films on which the stock actually floats and, hence, encounters on its feed no resistance from the platen faces 24 and 26, with the air films having, however, sufficiently high integrals of pressure over the extent of these interfaces to impart the considerable lamination pressure from the platens 12 and 14 to the stock s so that it will be completely laminated by the time it passes from the press. Air from the films constantly exhausts to atmosphere at the circumferences of the interfaces of the platens and stock, and these films are constantly supplied with air from the orifices 38 at the exhaust rate of the air from these films, as will be readily understood. In order to attain the requisite high integral of pressure in the air films over the extent of the interfaces of the platens and stock, several factors have to be taken into consideration. Thus, it is basic that the orifices must be quite small for maintaining the air films at a good weight flow rate and very small thickness at which they have low pressure gradients and, hence, high integrals of pressure over their extent, yet these orifices must not be so fine as to consume a great deal of the pressure of the air by the time it leaves them and enters the air films at a pressure insufficient to maintain them at the required integral of pressure. Further, in order to keep the air films continuous and at the requisite integrals of pressure, the orifices must be spaced relatively closely which involves quite a multitude of orifices in a good size platen. In this connection, it is impossible to set up ranges within which the sizes of the orifices and their spacing must lie for certain lamination pressures, partly because they cannot be accurately calculated at least at present owing to factors which do not permit their accurate or even approximate determination on hand of the aerodynamic laws, and partly because it has been found that the sizes of the orifices may vary relatively widely with their spacing for the same lamination pressures at the same or different pressures of the supply air. To give at least some indication, however, of suitable orifice sizes and supply air pressures, it may be mentioned, by way of example and by no means in any limiting way, that satisfactory lamination of various sheet stocks was achieved with orifices of .040" diameter at pressures of the supply air well within the capacity of the average compressors in most industrial plants. Further, to confine the air films to their requisite uniformity in thickness throughout at which they will hold the required high integral of pressure, the faces 28 and 30 of the laminar stock must be as plane and smooth and also air-impermeable as the faces 24 and 26 of the platens 12 and 14, and the individual sheets to be laminated must also be of fairly uniform thickness throughout, as will be readily understood.

While in the exemplary press operation of FIGS. 1 and 2 the laminar stock is continuously fed, the same may be fed intermittently, and even back and forth, if this should be desired for any reason. Moreover, the exemplary press 10 lends itself to lamination of laminar stock which is placed between the platens and laminated while stationary for one reason or another, as for example laminating stock the opposite faces of which must not be marred in the slightest by contact with pressure-exerting surfaces such as the platen faces or feed rolls.

Reference is now had to FIG. 4 which shows a press installation 60 that lends itself to lamination of laminar sheet stock s' the opposite faces of which are either air-permeable or too rough for lamination in the described press 10, or both, such as plywood, woven fabrics, filter fabrics, etc. To this end, the press component 10' may in all respects be like the described press 10, but there are added two belts 62 and 64 which have parallel operating runs 66 and 68, respectively, that are interposed between the adjacent faces 24', 28' and 26', 30' of the platens 12', 14' and laminar stock s'. The belts 62 and 64, which may be flexible air-impervious steel belts with smooth surfaces, are led over pulleys 70, 72 and 74, 76, respectively, which are journalled in end stands 78 and 80, with the pulleys 74, 76 of the top belt 64 being in the respective stands 78 and 80 preferably adjustable to and from their adjacent lower pulleys 70, 72 to accommodate laminar stock of different thickness. Further, while in the previously described press 10 of FIGS. 1 to 3 the weight of the upper platen determines the lamination pressure on the stock, the present press 10' has provisions for clamping the upper platen 14' to the lower platen 12' for regulating the lamination pressure within wide limits for different applications. To this end, the reduced shanks 19' of the posts 18' are threaded to receive clamping nuts 84.

In operation of the press installation 60, with the laminar stock s' being constantly fed in any suitable manner in the direction of the arrow 86, for example, the air films maintained between the interfaces of the platens 12', 14' and respective belt runs 66 and 68 have adequately high differentials of pressure to impart the lamination pressure to the laminar stock s' through intermediation of the belt runs 66 and 68 which together with the platen faces 24', 26' confine the air films at the uniformity of thickness throughout at which they hold their required high integrals of pressure. Of course, the present press installation 60 has the same versatility in operation as the previously described press 10 in point of laminating stock while being fed continuously or intermittently or not at all, or while being moved back and forth. Also, the belts 62 and 64 may act to feed the laminar stock by power-driving the pulleys 72 and 76, for example.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. A press for laminating laminar sheet stock in motion, comprising fixed companion platens with plane and parallel opposing faces adapted to exert lamination pressure against adjacent faces of interposed stock, of which each platen has an internal chamber with an air inlet and orifices in and distributed over said face thereof and leading to said chamber, with said orifices being sufficiently narrow and large in number to pass compressed air from said chambers and maintain between the adjacent faces of the platens and interposed stock stock-floating air films of adequate integrals of pressure to impart the lamination pressures to the stock; and means for feeding stock between said platens for its lamination while in motion.

2. A laminating press as set forth in claim 1, which further comprises means for clamping said platens together with a variable force which determines the lamination pressure against interposed stock.

3. A press for laminating laminar sheet stock in motion, comprising companion platens with plane and parallel opposing faces; flexible companion belts having plane air-impermeable faces, and rotary pulleys over which said belts are led to provide parallel belt runs between and adjacent and parallel to said platen faces, each of said platens having an internal chamber with an air inlet and orifices in and distributed over said face thereof and leading to said chamber, with said orifices being sufficiently narrow and large in number to pass compressed air from said chambers and maintain between the adjacent faces of the platens and belt runs belt-floating air films of adequate integrals of pressure to impart lamination pressures from the platens to the belt runs and stock therebetween; and means for feeding stock between said belt runs for its lamination while in motion.

4. A laminating press as set forth in claim 3, in which said platens and pulleys are relatively adjustable to accommodate stock of different thickness.

References Cited

UNITED STATES PATENTS

| | | | |
|---|---|---|---|
| 2,135,763 | 11/1938 | Nicholson | 100—222 |
| 2,430,868 | 11/1947 | Francis | 156—583 |
| 2,975,701 | 3/1961 | Munschauer et al. | 100—295 |
| 2,984,398 | 5/1961 | Chalmers | 156—497 |
| 3,084,489 | 4/1963 | Seefluth | 156—497 |
| 3,093,528 | 6/1963 | Reich | 156—584 |

EARL M. BERGERT, *Primary Examiner.*